(12) United States Patent
Geurts

(10) Patent No.: US 8,179,463 B1
(45) Date of Patent: May 15, 2012

(54) IMAGE SENSOR WITH SHARED NODE

(75) Inventor: Tomas Geurts, Haasrode (BE)

(73) Assignee: On Semiconductor Trading Ltd., Hamilton (BM)

( * ) Notice: Subject to any disclaimer, the term of this patent is extended or adjusted under 35 U.S.C. 154(b) by 357 days.

(21) Appl. No.: 12/468,581

(22) Filed: May 19, 2009

(51) Int. Cl.
*H04N 3/14* (2006.01)
*H04N 5/335* (2011.01)
(52) U.S. Cl. .................. 348/296; 348/299; 348/301
(58) Field of Classification Search .................. 348/296, 348/301
See application file for complete search history.

(56) References Cited

U.S. PATENT DOCUMENTS

| 6,566,697 | B1 | 5/2003 | Fox et al. | |
|---|---|---|---|---|
| 2005/0110884 | A1* | 5/2005 | Altice et al. | 348/302 |
| 2007/0046796 | A1* | 3/2007 | McKee | 348/294 |
| 2007/0063127 | A1* | 3/2007 | Bock | 250/208.1 |
| 2009/0219418 | A1* | 9/2009 | Fujita | 348/243 |
| 2009/0219421 | A1* | 9/2009 | Altice et al. | 348/296 |
| 2010/0328509 | A1* | 12/2010 | Yamashita et al. | 348/300 |

* cited by examiner

*Primary Examiner* — Jordan Schwartz
(74) *Attorney, Agent, or Firm* — Rennie William Dover

(57) ABSTRACT

In accordance with an embodiment of the present invention, an image sensor comprises a plurality of pixel sensing circuits. Each pixel sensing circuit includes a photodiode and a storage node. Each pixel sensing circuit further includes a first transistor coupled between the photodiode and the storage node and a second transistor coupled between the photodiode and a shared node. The shared node is coupled to the plurality of pixel sensing circuits. The image sensor may include a reset transistor and/or a read-out circuit coupled to the shared node.

4 Claims, 4 Drawing Sheets

IMAGE SENSOR WITH SHARED NODE

TECHNICAL FIELD

Embodiments of the present invention relate to the field of electronic image sensors.

BACKGROUND

Complementary Metal Oxide Semiconductor (CMOS) image sensors have come to dominate the image sensor marketplace for numerous applications because of the areas of integration, power consumption/dissipation and total system size. CMOS image sensors are used for applications including, for example, camera phones, security cameras, PC video capture, barcode scanners, fax machines, desk-top scanners, toys, biometric devices and the like.

Three useful features found in many charge coupled device (CCD) images sensors are global shutter mode, pipeline shutter mode and binning. In a global shutter mode of operation, the pixels are reset before integration. The pixels are allowed to accumulate charge during an integration ("exposure") time. At the end of the integration time, the accumulated charge from each pixel is transferred to a storage area. Then the signals are read out from the storage area. Since the pixels are reset at the same time, integrate over the same time interval, and are transferred to the storage area at the same time, the global shutter mode may diminish motion artifacts compared to some other electronic shutter modes.

The term "pipeline" or "pipeline shutter" is generally understood to describe or refer to an electronic shutter mode in which a pixel accumulates light energy and transfers its charge to a memory element associated with the pixel. While the pixel's memory element is being read, the pixel's integrating element is accumulating light. In this manner, pixels are almost constantly "exposed," have a higher refresh rate and produce more images or "frames per second." A pipeline shutter mode maybe well suited to high speed image capture.

Binning is generally understood to describe or refer to a method of combining the output of individual pixels in the charge domain, as opposed to combining in the voltage domain. Binning generally produces enhanced low-light operation with reduced noise effects, in comparison to other techniques.

BRIEF DESCRIPTION OF THE DRAWINGS

Unless otherwise noted, the drawings are not drawn to scale.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents. Furthermore, in the following detailed description, numerous specific details are set forth in order to provide a thorough understanding of the disclosure. However, it will be recognized by one of ordinary skill in the art that the disclosed embodiments may be practiced without these specific details. In other instances, well known methods, procedures, components, and circuits have not been described in detail as not to unnecessarily obscure aspects of the invention.

NOTATION AND NOMENCLATURE

As used in the present application, the term "pixel" or "pixel sensing circuit" are used interchangeably to describe or refer to the smallest unit of light sensitive circuit of an image sensing device or pixel array. For example, a pixel generally includes one light sensitive element, e.g., a photo diode, and associated circuitry for managing that light sensitive element and its output. In the electronic image sensing arts, image sensing devices generally comprise multiple pixels, e.g., organized into an array of pixels, and are generally described in terms of their resolution in pixels. For example, the "LUPA13002" image sensing device, commercially available from Cypress Semiconductor Corporation of San Jose, Calif., may comprise an array of 1280×1024 individual active pixels, for a total of 1,310,720 individual pixels. Individual pixels or pixel sensing circuits are frequently described in terms of the number of transistors per each photo-sensitive element. For example, a "4T" pixel generally comprises four transistors per pixel.

Image Sensor with Shared Node

Figure 1:
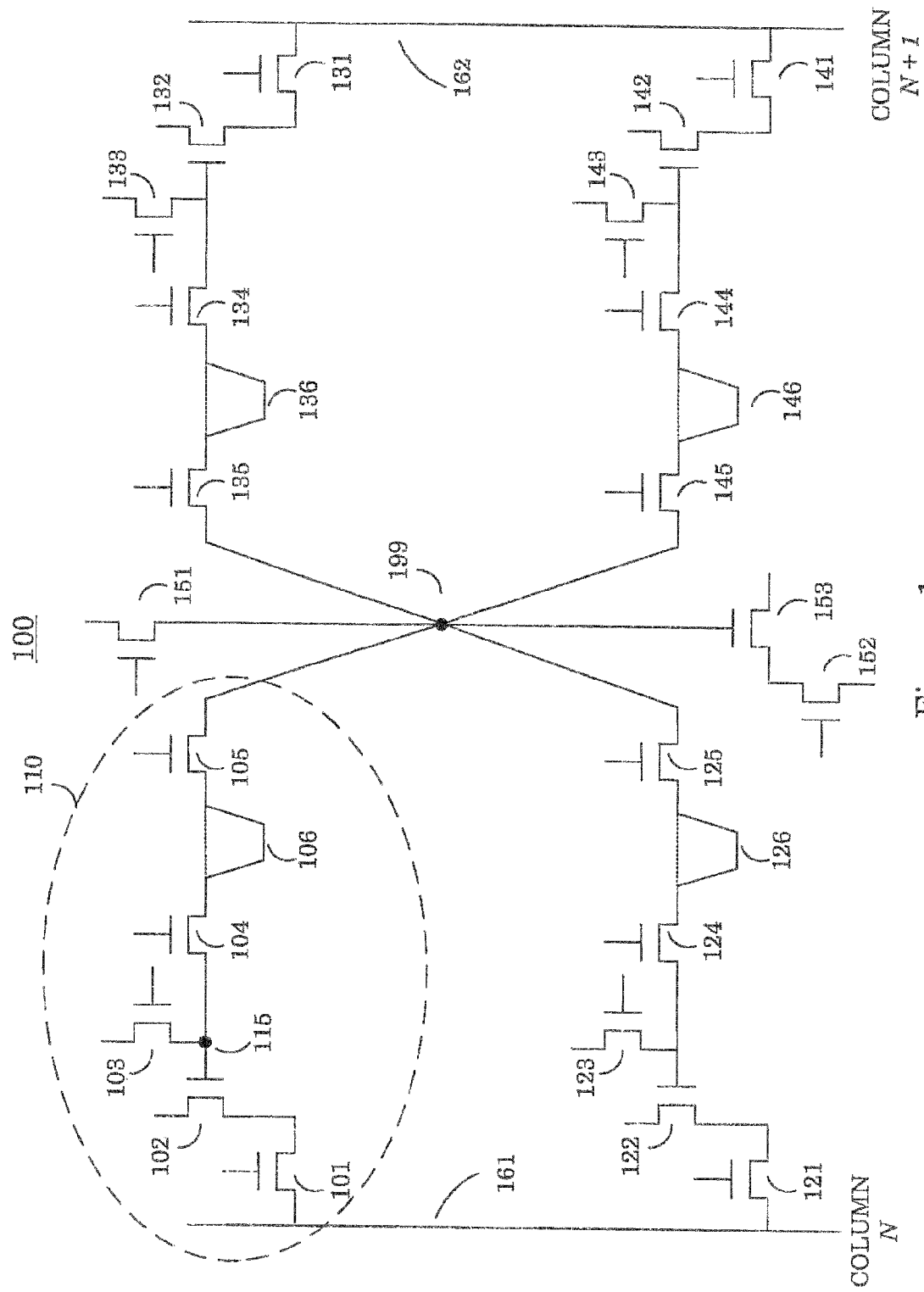
FIG. 1 illustrates an embodiment of an image sensing circuit comprising an image sensor with a shared node, in accordance with embodiments of the present invention.

FIG. 1 illustrates an embodiment of an image sensing circuit 100 comprising an image sensor with shared node 199, in accordance with embodiments of the present invention. In this embodiment, image sensing circuit 100 comprises four substantially similar picture elements or "pixels" in an embodiment. It is appreciated that embodiments in accordance with the present invention are well suited to other numbers of pixels sharing a node.

In an embodiment, a first pixel 110 comprises a photo diode 106, which may be a "pinned" or buried photo diode. Transfer gate transistors 104, 105 control the flow of charge out of photo diode 106. Pixel reset transistor 103 functions to drain charge out of photo diode 106, e.g., to "reset" photo diode 106 to establish a low noise floor for the pixel. Pixel 110 comprises a capacitive "floating diffusion" between transfer gate transistor 104, reset transistor 103 and the gate of source follower transistor 102. The floating diffusion serves as an analog storage element for charge from photo diode 106, enabling, for example, a pipeline shutter mode. The floating diffusion is depicted as storage node 115 in FIG. 1. It is appreciated that floating diffusion 115 may be a structural element of transfer gate transistor 104, in an embodiment.

In an embodiment, the first pixel 110 further comprises a source follower amplifier 102, which generally serves as a buffer for the charge "read" from photo diode 106. A select transistor 101 serves to couple the charge from photo diode 106 to a column line 161.

In an embodiment, transfer gate transistors 104 and 105 receive clocked control signals to control the flow of charge out of photo diode 106. The charge is generally the result of interaction between light energy and photo diode 106. With transfer gate transistor 104 and pixel reset transistor 103 closed, charge is "bled off" from photo diode 106 to establish a low noise floor against subsequent accumulation of charge in photo diode 106 due to light exposure.

In an embodiment, the first pixel 110 is capable of pipeline shutter operation and global shutter operation.

In an embodiment, an mage sensor comprises multiple pixels, e.g., arranged in rows and columns. Image sensing circuit 100 comprises four pixels in an embodiment. Pixel 110, comprising transistors 101, 102, 103, 104, 105 and photo diode 106 has been described previously. A second pixel, comprising transistors 121, 122, 123, 124, 125 and photo diode 126 operates in a similar fashion. A third pixel, comprising transistors 131, 132, 133, 134, 135 and photo diode 136 operates in a similar manner, except that its output is coupled to a different column line 162. A fourth pixel, comprising transistors 141, 142, 143, 144, 145 and photo diode 146 operates in a similar manner to the above described third pixel.

It is to be appreciated that each pixel in image sensing circuit 100 may be individually addressed and read. For example, pixel 110 can be read via column line 161 when select transistor 101 is closed.

In an embodiment, an array of pixels, e.g., an array comprising pixels such as pixel 110, is unable to operate in a binning mode. In accordance with embodiments of the present invention, the drains of the second transfer gate transistors for each pixel, e.g., transfer gate transistors 105, 125, 135 and 145 are tied together at shared node 199, to form image sensing circuit 100. In a manner similar to that of floating diffusion node 115 of pixel 110, shared node 199 may include a floating diffusion storage element. Image sensing circuit 100 may also be considered a "super pixel." Alternatively, image sensing circuit 100 may be viewed as a single picture element comprising four subpixels.

As previously described, the drains of the second transfer gate transistors for each individual pixel, e.g., transfer gate transistors 105, 125, 135 and 145 are tied together at shared node 199. Image sensing circuit 100 comprises a source follower transistor 153 coupled to shared node 199 and a select transistor 152. When source follower transistor 153, select transistor 152 and transfer gate transistors 105, 125, 135 and 145 are closed, the charge from the pixels, e.g., photo diodes 106, 126, 136 and 146, is added together. In this embodiment, the image sensing circuit 100 is able to gather very low light energy impinging the four separate photo diodes 106, 126, 136 and 146 and combine their output in a very low noise manner in the charge domain, e.g., without a prior conversion to the voltage domain. Thus, image sensing circuit 100 enables binning, and is capable of low light performance.

Reset transistor 151, coupled to shared node 199, may drain charge from the four separate photo diodes 106, 126, 136 and 146 in a single operation, e.g., to "reset" image sensing circuit 100, to establish a low noise floor for the image sensing circuit 100, in a manner similar to that of reset transistor 103, previously described. It is appreciated that reset transistor 151 is not required to "reset" or drain charge from the four separate photo diodes 106, 126, 136 and 146, in an embodiment. For example, the four separate photo diodes 106, 126, 136 and 146 may be reset by the reset transistors within each pixel circuit, e.g., reset transistors 103, 123, 133 and 143, respectively. In an embodiment, the photo diodes 106, 126, 136 and 146 may be reset at different times. In an embodiment, reset transistor 151 may be used to "reset" or drain charge from the floating diffusion 199.

The illustrated embodiment of image sensing circuit 100 comprises four photo diodes 106, 126, 136 and 146, eight transmission gate transistors 104, 105, 124, 125, 134, 135, 144 and 145. Image sensing circuit 100 comprises five floating diffusions: one floating diffusion per pixel, e.g., floating diffusion 115 and its equivalents, and one floating diffusion that is shared among all pixels, e.g., at shared node 199. Image sensing circuit 100 also comprises five read out circuits, one read out circuit per pixel and one read out circuit that is shared among all pixels. There are a total of 23 transistors among the four pixels and shared elements, providing for a 23/4=5.75T pixel architecture, in one embodiment.

It is to be appreciated that embodiments of the present invention are well suited to combinations of different numbers of pixel elements. For example, embodiments in accordance with the present invention may comprise 1×2, 2×1 and red, green, blue (RGB) pixel arrays.

Figure 2:
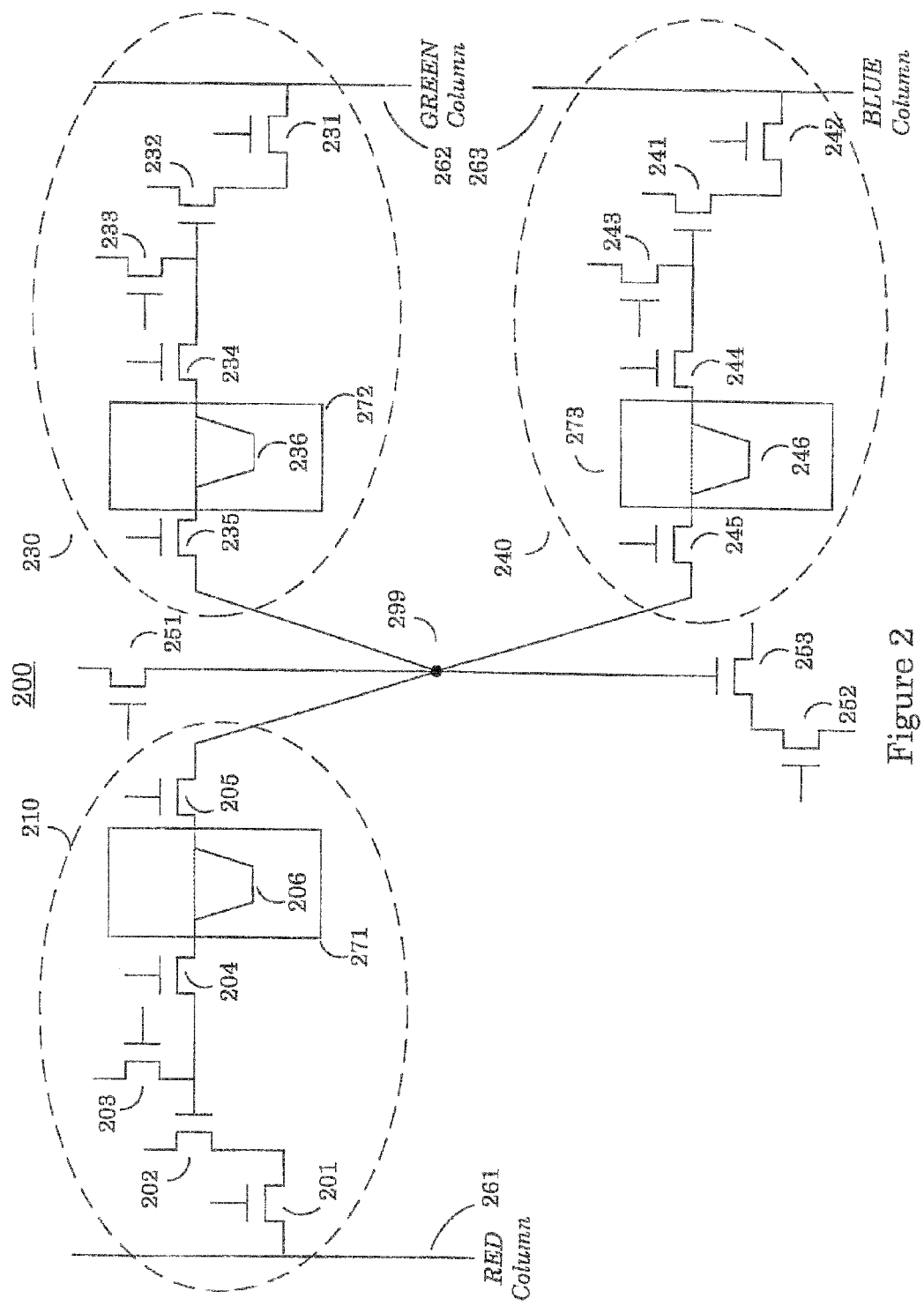
FIG. 2 illustrates a red, green, blue (ROB) image sensor, in accordance with embodiments of the present invention.

FIG. 2 illustrates a red, green, blue (RGB) image sensor 200, in accordance with embodiments of the present invention. FIG. 2 illustrates an arrangement of three pixels, 210, 230 and 240. Individually, each pixel is similar to one another and similar to pixel 110, as previously described with respect to FIG. 1. Similar reference indicia indicate similar device types and functions. For example, select transistor 201 serves the same function as select transistor 101 of FIG. 1.

The light sensitive element of each pixel 210, 230 and 240, e.g., photo diodes 206, 236 and 246, is covered with a different color light filter, in one embodiment. For example, photo diode 206 is covered with a red pass filter 271, such that red light creates charge in photo diode 206 and other colors of light have decreased effect photo diode 206. Similarly, photo diode 236 is covered with a green pass filter 272, such that green light creates charge in photo diode 236 and other colors of light have decreased effect on photo diode 236. Photo diode 246 is covered with a blue pass filter 273, such that blue light creates charge in photo diode 246 and other colors of light have decreased effect photo diode 246. The whole RGB array may not have equal numbers of red, green or blue pixels in some embodiments.

Each pixel of a certain color is coupled to a column line associated with that color. For example, red pixel 210 is coupled to a red column line 261, green pixel 230 is coupled to a green column line 262 and blue pixel 240 is coupled to a blue column line 263.

In an embodiment, the signals of each pixel are treated separately. In an embodiment, the color filters are non-ideal, and attenuate even the light they are designed to pass. Consequently, such an RGB image sensor generally uses more illumination than a similar image sensor without color filters.

In accordance with embodiments of the present invention, the three filtered pixels 210, 230 and 240 may be binned together, to aggregate their signals and improve the low light performance of such a color sensor.

In a similar manner to that previously described for image sensor 100 (FIG. 1), the drains of the second transfer gate transistors for each pixel, e.g., transfer gate transistors 205, 235 and 245 are tied together at shared node 299, to form a image sensing circuit 200. Alternatively, circuit 200 may be viewed as a single picture element comprising three subpixels. Shared read out circuitry comprises source follower transistor 253 and select transistor 252.

When source follower transistor 253, select transistor 252 and transfer gate transistors 205, 235 and 245 are closed, the charge from all pixels, e.g., photo diodes 206, 236 and 246, is added together. Image sensing circuit 200 is able to gather very low light energy impinging the three separate photo diodes 206, 236 and 246 and combine their output in a very low noise manner in the charge domain, e.g., without a prior conversion to the voltage domain. Thus, image sensing circuit 200 enables binning, and is capable of low light performance.

In an embodiment, pixels of the same color could be binned. For example, a group of multiple green pixels could be coupled together with elements similar to reset transistor 251 and read-out circuit 252, 253.

Although the foregoing descriptions of embodiments in accordance with the present invention have been presented in terms of complementary metal oxide semiconductor (CMOS) devices and circuits, embodiments in accordance with the present invention are not so limited. It is to be appreciated that embodiments in accordance with the present invention are well suited to a variety of technologies for light sensors and switching functions, including, for example, MOS, BiCMOS, double diffusion insulated gate field effect transistors (DDMOS), integrated and discrete circuits in any combination.

Figure 3:
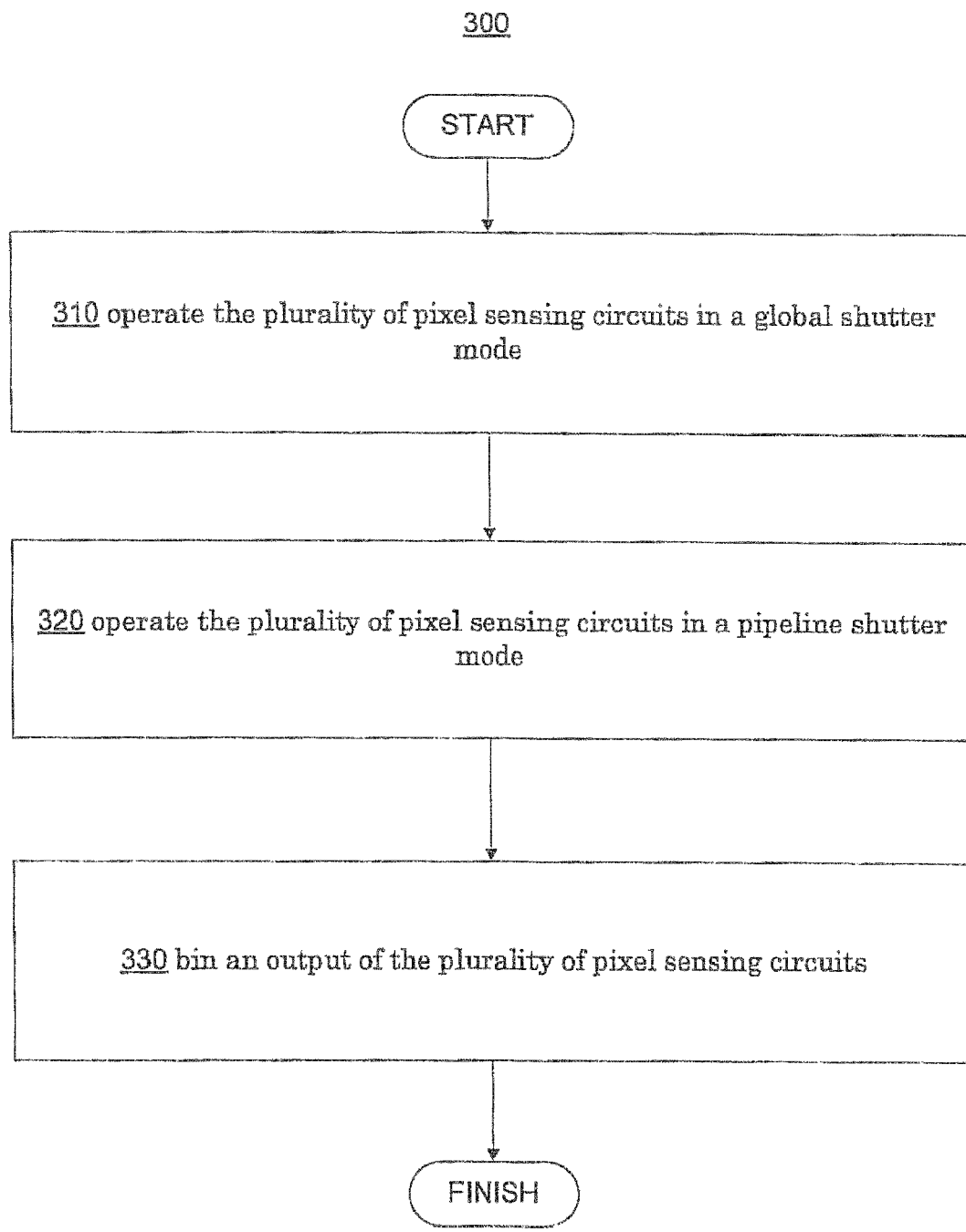
FIG. 3 illustrates a flow chart for a method for operating an image sensor device comprising a plurality of pixel sensing circuits, in accordance with embodiments of the present invention.

FIG. 3 illustrates a flow chart for a method 300 for operating an image sensor device comprising a plurality of pixel sensing circuits, in accordance with embodiments of the present invention.

In 310, the plurality of pixel sensing circuits is operated in a global shutter mode. For example, the pixel sensing circuits are reset before integration. The pixel sensing circuits are allowed to accumulate charge during an integration ("exposure") time. At the end of the integration time, the accumulated charge from each pixel sensing circuit is transferred to a storage area. Then the signals are read out from the storage area. Since the pixel sensing circuits are reset at the same time, integrate over the same time interval, and are transferred to the storage area at the same time, a global shutter mode minimizes motion artifacts, in contrast to some other electronic shutter modes.

In 320, the plurality of pixel sensing circuits is operated in a pipeline shutter mode. For example, a pixel sensing circuit accumulates light energy and transfers its charge to a memory element associated with the pixel sensing circuit, e.g., at floating diffusion 115 of FIG. 1. While the pixel sensing circuit's memory element is being read, the pixel sensing circuit's integrating element is accumulating light. In this manner, pixel sensing circuits are almost constantly "exposed," have a high refresh rate and produce more images or "frames per second." A pipeline shutter mode is well suited to high speed image capture.

In 330, an output of the plurality of pixel sensing circuits is binned. For example, the output of individual pixel sensing circuits are combined in the charge domain, as opposed to being combined in the voltage (or some other) domain. For example, the output of individual pixel sensing circuits 210, 230 and 240 are combined at shared node/floating diffusion 299 of FIG. 2. Binning generally produces enhanced low-light operation with reduced noise effects, in comparison to other techniques.

In this manner, one single image sensing device may be operated in a variety of shutter modes, including a global shutter mode and a pipelined shutter mode. In addition, the same image sensing device may be operated in a binning mode, in which the output of some or all of the individual pixel sensing circuits is combined in the charge domain, which may provide low noise, low light performance.

Figure 4:
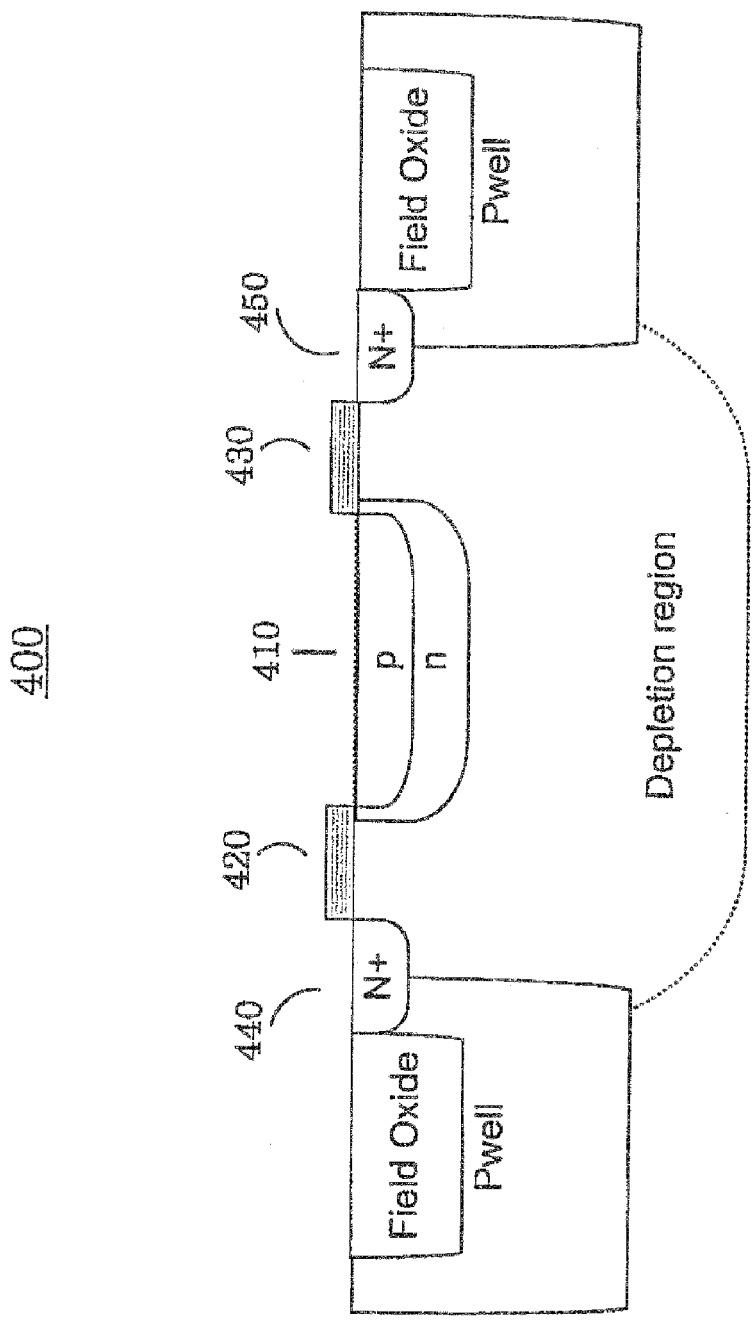
FIG. 4 illustrates a side sectional view of an embodiment of a portion of a pixel sensing circuit, in accordance with embodiments of the present invention.

FIG. 4 illustrates a side sectional view of an embodiment of a portion 400 of a pixel sensing circuit, in accordance with embodiments of the present invention. Pixel sensing circuit portion 400 may generally correspond to a portion of pixel 110 as described with respect to FIG. 1.

Pixel sensing circuit portion 400 comprises a photo diode 410, generally equivalent to photo diode 106 of pixel 110 of FIG. 1. Pixel sensing circuit portion 400 comprises two transfer gates, 420 and 430, coupled to photo diode 410. Transfer gate 420 is generally equivalent to transfer gate 104 of pixel 110 of FIG. 1. Transfer gate 430 is generally equivalent to transfer gate 105 of pixel 110 of FIG. 1.

Pixel sensing circuit portion 400 further comprises floating diffusion 440 and floating diffusion 450. Floating diffusion 440 is coupled to transfer gate 420 and is generally equivalent to the floating diffusion identified at node 115 of FIG. 1. The floating diffusion 440 may serve as an analog storage element for charge from photo diode 410. Floating diffusion 450 is coupled to transfer gate 430 and is generally equivalent to the floating diffusion identified at node 199 of FIG. 1. It is appreciated that other pixel sensing circuits may share floating diffusion 450, e.g., as illustrated by the plurality of photo sensing circuits or pixels in FIGS. 1 and 2. Floating diffusion 450 may serve as an analog storage element for charge from a plurality of photo diodes, e.g., photo diodes associated with a plurality of pixels. Accordingly, floating diffusion 450 may enable a binning mode of operation for a plurality of pixels.

As previously described with respect to FIGS. 1, 2 and 3, charge generated by light interacting with photo diode 410 may be coupled to floating diffusion 440 and/or floating diffusion 450 by the operation of transfer gates 420 and/or 430, respectively. Charge stored on floating diffusion 440 may be read out by additional circuitry (not shown) associated with the pixel sensing circuit, in one embodiment. Charge stored on floating diffusion 450 may be read out by additional circuitry (not shown) associated with a plurality of pixels.

Embodiments in accordance with the present invention provide systems and methods of image sensors with shared read-out circuitry. In addition, systems and methods CMOS image sensors with shared read-out circuitry that provide global shutter mode, pipeline shutter mode and binning are provided. Embodiments in accordance with the present invention also provide for systems and methods of CMOS image sensors with shared read-out circuitry that are compatible and complimentary with existing systems and methods of semiconductor image sensor manufacturing and operation.

Various embodiments of the invention are thus described. While the present invention has been described in particular embodiments, it should be appreciated that the invention should not be construed as limited by such embodiments, but rather construed according to the below claims.

What is claimed is:

1. An image sensor device comprising:
  a plurality of pixel sensing circuits, each pixel sensing circuit comprising:
    a photodiode;
    a storage node;
    a first transistor serving as a first transfer gate coupled between the photodiode and the storage node;

a second transistor serving as a second transfer gate coupled between the photodiode and a shared node, wherein said shared node is coupled to said plurality of pixel sensing circuits;

a third transistor coupled to said storage node for resetting said each of said pixel sensing circuit;

a fourth transistor serving as a source follower transistor coupled to said storage node; and a fifth transistor coupled to said source follower transistor configured for selecting said each of said plurality of pixel sensing circuits to a column line.

2. The image sensor device of claim 1 further comprising a read out circuit coupled to said shared node.

3. The image sensor device of claim 2 wherein said read out circuit comprises a source follower transistor coupled to a transistor for selecting an output of said shared node.

4. The image sensor device of claim 1 further comprising a transistor for resetting said plurality of pixel sensing circuits coupled to said shared node.

* * * * *